United States Patent [19]

Towner et al.

[11] 3,870,216

[45] Mar. 11, 1975

[54] DATA RECORDERS

[75] Inventors: Frank Richard Towner, Wokingham; John Robert Snook, Bracknell, both of England

[73] Assignee: Sperry Rand Limited, London, England

[22] Filed: Sept. 10, 1973

[21] Appl. No.: 396,030

[30] Foreign Application Priority Data

Sept. 29, 1972 Great Britain .................... 45021/72

[52] U.S. Cl. .................... 226/181, 226/13, 242/197

[51] Int. Cl. .................... B65h 17/20

[58] Field of Search ......... 226/13, 51, 61, 169, 178, 226/181; 242/197, 198, 199, 200; 274/4 B, 4 C, 4 D, 11 B, 11 C, 11 D

[56] References Cited

UNITED STATES PATENTS

| | | | |
|---|---|---|---|
| 3,295,782 | 1/1967 | Stark | 242/55.19 A |
| 3,326,484 | 6/1967 | Yefsky | 242/55.19 A |
| 3,685,754 | 8/1972 | Cousino | 242/55.19 A |
| 3,767,137 | 10/1973 | Richt | 274/4 D X |

FOREIGN PATENTS OR APPLICATIONS

| | | | |
|---|---|---|---|
| 1,163,090 | 2/1964 | Germany | 274/11 D |

*Primary Examiner*—Richard A. Schacher
*Attorney, Agent, or Firm*—Howard P. Terry

[57] ABSTRACT

A data recorder comprises a tape deck having a capstan operable to drive a recording medium in the form of a tape, and drive means operable to drive the capstan, the drive means comprising a motor drivingly connected to the capstan through one or both of a pair of flywheels which in use are arranged to rotate in opposite directions. In this way, the drive to the capstan is stabilised even when the recorder is subjected to angular acceleration.

6 Claims, 4 Drawing Figures

DATA RECORDERS

BACKGROUND OF THE INVENTION

Field Of The Invention

This invention relates to data recorders and more particularly, although not exclusively, to flight data acquisition recorders.

SUMMARY OF THE INVENTION

According to the present invention a data recorder comprises a tape deck having a capstan operable to drive a recording medium in the form of a tape, and drive means operable to drive the capstan, the drive means comprising a motor drivingly connected to the capstan through one or both of a pair of flywheels which in use are arranged to rotate in opposite directions.

With this arrangement, the drive to the capstan is stabilised to the extent that it is not subjected to any substantial variation giving rise to "wow" as a result of angular acceleration to which the recorder may be subjected in the plane of, or in a plane parallel to the plane of, the flywheels, such forces being balanced out by the flywheels. This is particularly important in data recorders for aircraft as the manoeures of the latter often give rise to such angular acceleration.

The motor may be arranged to drive, through a belt, one flywheel connected directly to the capstan, the other flywheel being in engagement with the belt in such a way as to be rotated in a direction opposite to that of said one flywheel. Alternatively, the motor may be arranged to drive one flywheel which in turn is arranged to drive the other flywheel which is drivingly connected to the capstan.

Flight data acquisition recorders embodying the invention will now be described, in greater detail, by way of example, with reference to the accompanying drawings, in which:

DESCRIPTION OF THE PREFERRED EMBODIMENTS

Figure 1:
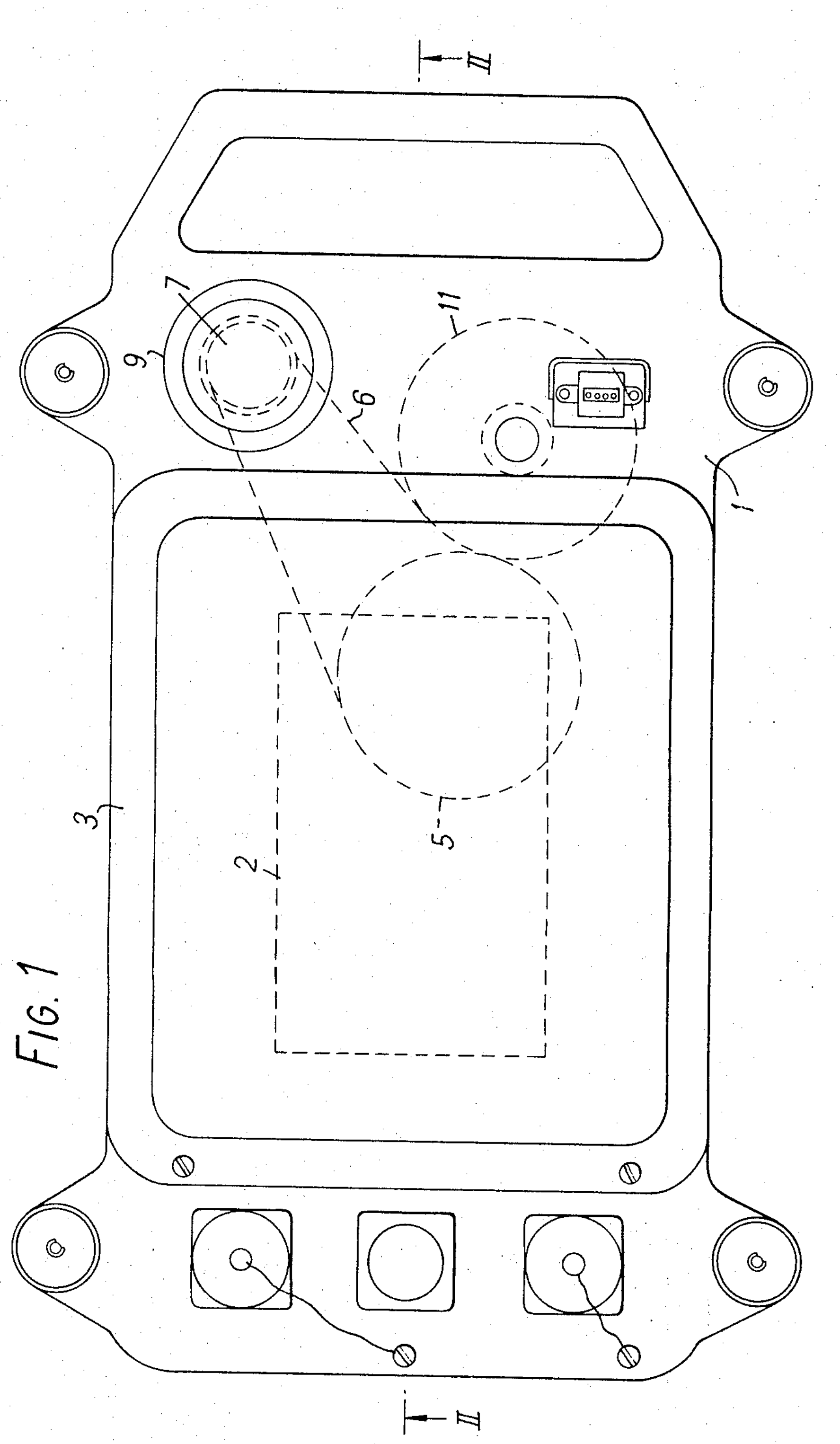
FIG. 1 is a plan view of one recorder.
Figure 2:
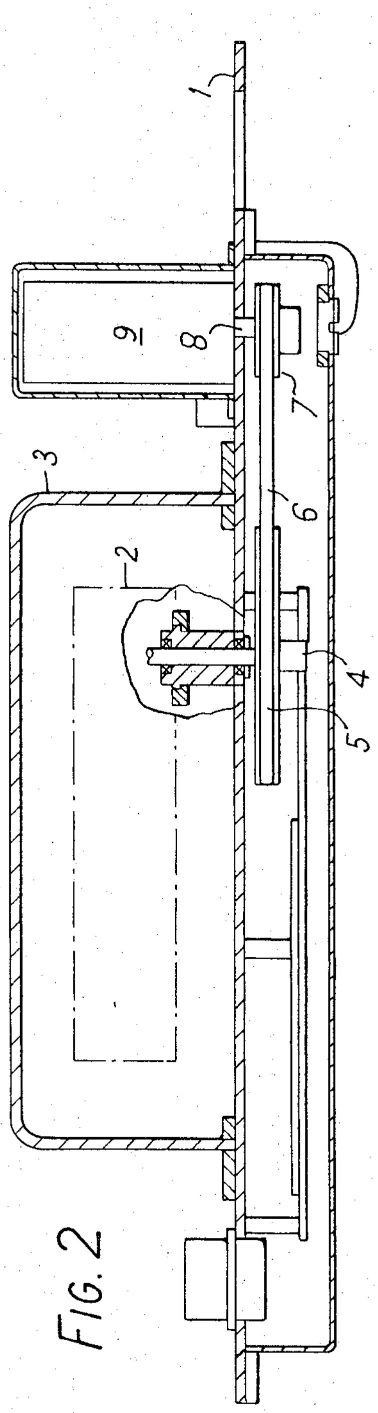
FIG. 2 is a section along line II—II of FIG. 1.

Referring to FIGS. 1 and 2, the recorder in the main is only shown in outline as the details thereof are not pertinent to the present invention. The recorder has a main support plate 1 extending across the entire unit and supporting a tape deck mounted within a protective casing indicated at 2, the latter being in turn mounted within an outer protective casing 3.

The recording tape (not shown) is driven by a conventional capstan of which only a shaft 4 thereof is shown in FIG. 2. The shaft 4 extends through the support plate 1 and carries towards its outer end a flywheel 5 which is driven by a belt 6 from a pulley 7 connected to one end of an output shaft 8 of an electric motor 9. The motor 9 is mounted on the support plate 1 and the output shaft 8 extends therethrough. A further flywheel 11 is rotatably mounted on the support plate 1 in such a position adjacent the flywheel 5 that it is also driven by the belt 6, the two flywheels being on opposite sides of the belt whereby they are rotated in opposite directions.

Figure 3:
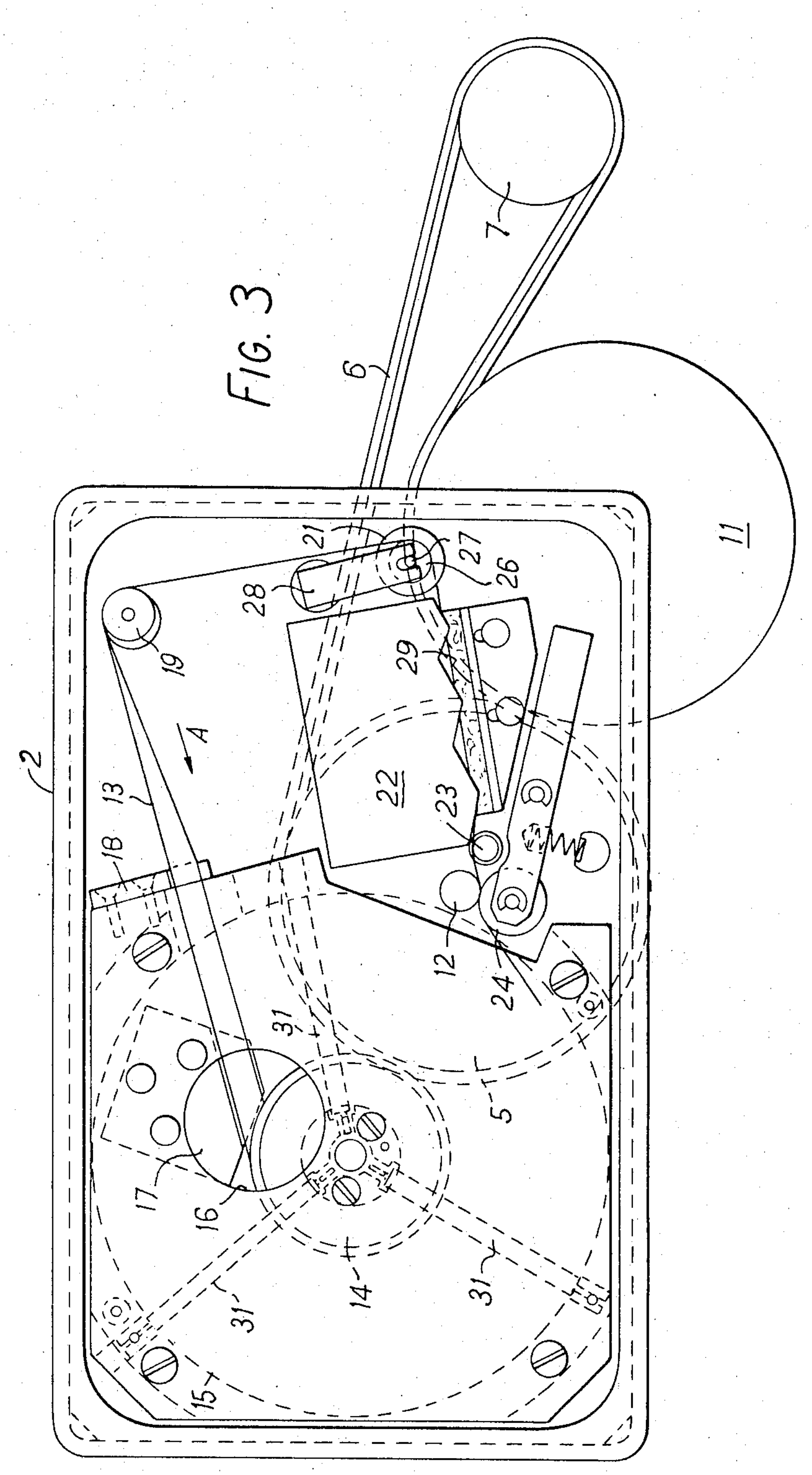
FIG. 3 is a plan view of a second recorder with certain parts removed.

Referring now to FIG. 3, the recorder of the second embodiment is generally similar to that of FIG. 1, the chief difference being the layout of the components of the tape deck which can be seen as the protective casings 2 and 3 have been removed. The drive to the capstan 12 is again through the agency of the motor 9, belt 6 and flywheel 5, with the second flywheel 11 also being provided to stabilise the drive to the capstan as before. The recording tape is shown in FIG. 3 and is indicated at 13. The tape 13 is in the form of a continuous loop and is contained on a reel 14 fitted with a generally cylindrical cover 15 having an annular top and a cylindrical body or skirt having two spaced slots formed in the skirt portion thereof. The top of the cover 15 has an aperture 16 across part of which extends a guide member in the form of a thin strip 17 of glass-loaded polytetrafluoroethylene (PTFE) secured to the underside of the cover.

Figure 4:
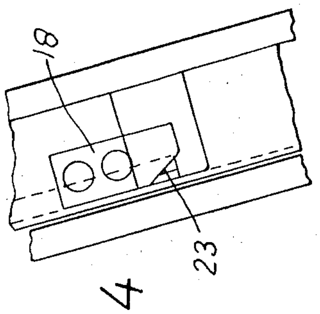
FIG. 4 is a detail of FIG. 1 seen in the direction of the arrow A.

The tape 13 is taken from the centre of the reel 14, over the edge of the strip 17, over a guide 18 composed of PTFE, around a barrell-type guide roller 19, a flanged guide roller 21, across a block 22 of three magnetic heads (comprising an ERASE, WRITE and MONITOR head), over a tapered guide roller 23, between the capstan 12 and a spring loaded pinch roller 24 and back on to the reel 14. As seen in FIG. 4, the guide 18 has an inclined surface 25 which serves to guide the tape from a substantially horizontal plane to a substantially vertical plane as it passes around the roller 19. Thus the tape 13 starts in a substantially vertical plane as it leaves the centre of the reel 14, is guided to a substantially horizontal plane by the strip 17 and is returned to a substantially vertical plane by the combined action of the guide 18 and roller 19.

The roller 21 has upper and lower flanges between which the tape 7 is guided and also has upper and lower bushes 26 of PTFE for mounting the roller for free rotation on a spigot 27 secured to the tape deck. A leaf spring 28 engages the upper bush 26 to ensure that the roller 21 cannot life thereby causing misalignment of the tape 13. The tape 13 is urged into contact with the respective magnetic heads by a pad 29 of formed plastic material.

It will be noted that the capstan 12 is mounted extremely close to the point at which the tape 13 returns to the reel 14 and this is important design feature of the embodiment being described. In previous arrangements there has always been a relatively large length of tape between the capstan and the point of return of the tape to the reel which length tends to become untensioned when the recorder is subjected to angular acceleration, for example, the resulting loose length of tape causing problems. However, in the present design there is only of the order of half an inch of tape 13 between the capstan 12 and the point of return to the reel 14 which virtually disposes of the problem.

Another advantageous design feature possessed by the present embodiment is that of the aperture 16 in the cover 15 and the strip 17, together with the slots in the skirt of the cover 16 through which the tape 13 leaves and returns to the reel 14. With this design, the assembly of the reel loaded with tape is simple in that the closed loop of tape 13 is wound onto the reel 14 with the desired number of turns and the reel positioned on the tape deck. The cover 15 is then fitted onto the reel 14, the loop of tape 13 having its two limbs passed through the respective slots in the skirt of the cover. The tape is then hooked over the edge of the strip 17, access being gained through the aperture 16. The tension in the tape 13 is checked which necessitates threading the tape around the various guides as described above and then running the recorder for a short length of time. If the tension is found to be incorrect, the reel cover 15 is removed and an adjustment made to the number of turns of tape on the reel 14, the tension then being checked again. This is repeated until the required tension is achieved.

This constitutes a much simpler procedure than in previous arrangements in which the tape was taken from the reel actually through the top of the reel cover, thereby necessitating cutting of the tape, assembling the reel cover and then joining up the two ends of the tape. Having run the recorder to check tape tension, this joint is within the body of tape on the reel so either a fresh cut in the tape has to be made to effect any required adjustment to the tension in the tape or the tape has to be run through its full length to retrieve and take apart the original joint. The former gives rise to a plurality of joints which is undesirable and the latter is time consuming. It will be appreciated that the length of tape and number of turns on the reel is predetermined but the actual tape tension when assembled has to be checked because the predetermined tension may not be achieved due to variations in tape thickness, tape coefficient of friction and reel dimensions, for example.

Three rollers 31 are mounted on the underside of the top of the reel cover 15, the rollers extending radially of the reel. Should the aircraft in which the recorder is fitted undergo a roll manoeuvre, for example, the reel 14 will be upsidedown at one stage whereupon the body of tape 13 on the reel will tend to contact the rollers 31, the latter being induced to rotate as tape continues to be drawn from and fed to the reel, whereby there is no appreciable resistance to this movement so that a relatively constant tape tension is maintained. If the rollers 31 were not provided, the tape would contact the static underside of the reel cover 15 which would offer resistance to the described tape movement and hence increase the tension therein.

It will be seen that in both the described embodiments the drive to the capstan is stabilised by the contra-rotating flywheels 5 and 11 which balance out any rotational acceleration forces created by torsional acceleration of the aircraft so that the capstan drive is maintained substantially constant.

We claim:

1. A data recorder comprising a tape deck having a capstan operable to drive a recording medium in the form of a tape, and drive means operable to drive the capstan, the drive means comprising a motor drivingly connected to the capstan through flywheel means comprising a pair of flywheels which in use are arranged to rotate in opposite directions, wherein the tape is in the form of a continuous loop wound on a reel, wherein the capstan is located closely adjacent the point of return of the tape to the reel and wherein a removable generally cylindrical cover is provided for the reel, the cover having an annular top and a cylindrical body with two spaced slots in the cylindrical body portion thereof through which respective portions of the tape extend in passing from the reel over guides and magnetic heads and back to the reel, both slots being open on the bottoms thereof to permit the slots encompass the respective portions of the tape as the cover is installed over the reel and to permit removal of the cover from the reel with the respective portions of the tape passing through the open bottoms of the slots as the cover is removed, the cover also having an aperture in the top thereof across part of which extends a first guide member for the tape operable to guide the plane of the tape through substantially 90°, said tape and first guide member being manually accessible through said aperture.

2. A recorder according to claim 1, wherein the motor drives one of the flywheels via a belt, said one flywheel being connected directly to the capstan, the other flywheel being in engagement with the belt such that it rotates in a direction opposite to that of said one flywheel.

3. A recorder according to claim 1, wherein the motor is arranged to drive one of the flywheels which in turn is arranged to drive the other flywheel which is drivingly connected to the capstan.

4. A recorder according to claim 1, wherein the first guide member is in the form of a strip of glass-loaded polytetrafluoroethylene.

5. A recorder according to claim 1, wherein a second guide member is provided for the tape after it leaves the first guide member, the second guide member being operable in conjunction with a guide roller to guide the plane of the tape back through the 90° turn occasioned by the first guide member.

6. A recorder according to claim 1, wherein a plurality of rollers are provided on the inner surface of the cover for the reel of tape, which rollers are contacted by the body of tape on the reel if the recorder is inverted.

* * * * *